Figure 1:
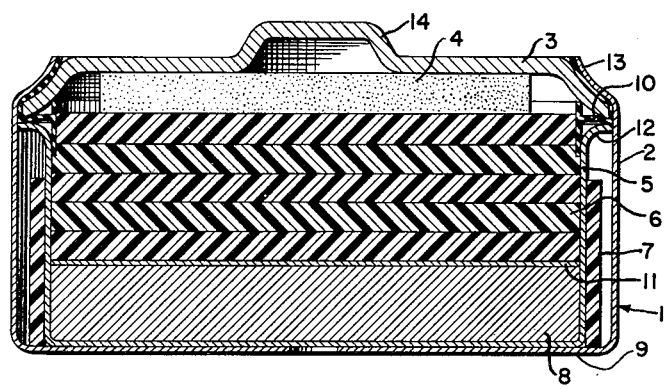

Dec. 21, 1954  M. B. GOLDBERG ET AL  2,697,737
RECHARGEABLE CADMIUM DRY CELL
Filed March 31, 1954

INVENTORS
M. B. GOLDBERG
H. B. REED, JR.

BY

ATTORNEYS

United States Patent Office 2,697,737
Patented Dec. 21, 1954

2,697,737

RECHARGEABLE CADMIUM DRY CELL

Monroe B. Goldberg, Hyattsville, and Herbert B. Reed, Jr., Silver Spring, Md., assignors to the United States of America as represented by the Secretary of the Navy Application March 31, 1954, Serial No. 420,222

9 Claims. (Cl. 136—6)

(Granted under Title 35, U. S. Code (1952), sec. 266)

The invention described herein may be manufactured and used by or for the Government of the United States of America for governmental purposes without the payment of any royalties thereon or therefor.

This invention relates to a dry cell battery and more particularly to a rechargeable cell displaying low voltage characteristics.

More particularly, the invention relates to a cadmium dry cell which may be recharged many times and of a character having a long shelf or storage life of at least two years. Heretofore, batteries of a rechargeable character have only been known in batteries generally falling in the wet cell category. In most instances, prior rechargeable batteries have incorporated an acid-type electrolyte, in a wet cell device, while the instant invention utilizes an alkaline electrolyte in a non-gassing dry cell type of construction. The instant invention provides a source of low voltage of approximately .9 volts having a high capacity per unit volume, displaying long storage life even at elevated temperatures up to 160° F., and further providing relatively constant voltage characteristics under load conditions.

Heretofore, it has been attempted to use series resistors of both the linear and non-linear varieties to provide a voltage drop when the normal cell voltage has been too high to be applied directly to devices requiring a lower operating voltage. Voltage divider arrangements have been used in some cases but a great deal of power is lost when using this method of deriving a low voltage from a cell. Series resistors, whether of the linear or non-linear variety, effectively reduce the dynamic range of the units derived from the energy source.

It is a feature of this invention to provide a low voltage source of potential, which is of a dry cell nature and which may be recharged many times during the life thereof.

One object of the invention is to provide a cell with a long shelf or storage life of at least two years.

Another object of the invention resides in the provision of a cell with a low temperature coefficient at the said low voltage of approximately .9 volts at no load or under light loads, and which will recover very rapidly even after subjection to heavy current drains thereby providing rapid voltage stabilizations under varying and intermittent load conditions.

In correlation with the immediately preceding object, it is a further object to provide a cell which will operate uniformly and dependably with only slight variations in voltage under elevated and lowered temperatures due to the said low temperature coefficient thereof.

It is another object of the invention to provide a dry cell having a high capacity per unit volume.

It is also an object to provide a dry cell which may be stored at elevated ambient temperatures up to 160° F. with only slightly reduced capacity.

Another object resides in providing a cell displaying less loss in capacity at low temperatures than dry cells heretofore or now in general use.

Another object resides in the provision of a cell which may be stored in a discharged condition and subsequently charged after long or short periods of time.

It is still another object to provide a rechargeable dry cell of low voltage characteristics which is capable of operating in any orientation.

It is a further object to provide a cell that will not produce gas during discharge or charge.

Another object lies in providing a rechargeable cell which may be charged in series or parallel with other similar cells.

Figure 2:
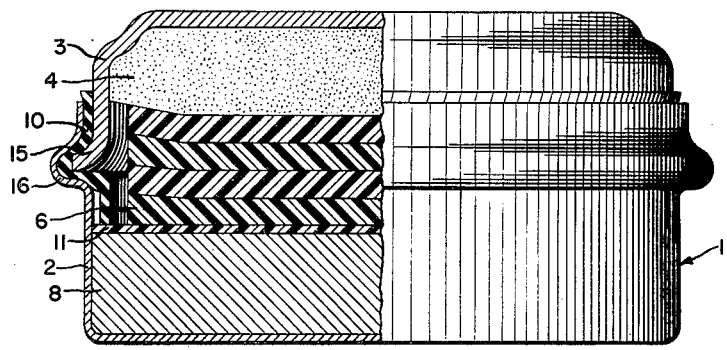

Other objects and many of the attendant advantages of this invention will be readily appreciated as the same becomes better understood by reference to the following detailed description when considered in connection with the accompanying drawings wherein:

Fig. 1 is a view in vertical section of a dry cell made according to one embodiment of the instant invention; and Fig. 2 is a view in elevation with parts broken away and in section, of a cell constructed according to a preferred embodiment of the instant invention.

Referring now to Fig. 1 of the drawings, there is shown a rechargeable dry cell assembly indicated generally at 1 having a two piece case comprising the lower containing shell element 2 which functions as one electrode of the cell and a top or closure element 3. The upper casing closure element 3 encloses the pressed consolidated anode pellet or mass 4 of powdered cadmium, pasted cadmium or cadmium amalgam. The lower casing 2 is provided with an inner cup shaped element 5 which receives the cathode pellet or mass 8.

The cathode pellet is comprised of a consolidated mass of mercuric oxide [HgO] or mercurous oxide [Hg₂O] and may have a small amount of graphite mixed therewith to increase the conductivity thereof. Disposed between the cup element 5 and the casing 2 is an absorbent mass 7 of generally cylindrical configuration. Within the cup element 5 and in superposed relation to the cathode 8 is a barrier layer 11 of unreactive microporous absorbent material. This may be of a material known in the trade as Synpor [microporous polyvinyl chloride], parchment paper, or any similar unreactive microporous material. The balance of the inner container or cup 5 is filled with a mass comprising a series of absorbent layers or discs 6 of alpha cellulose or similar unreactive absorbing material. This mass 6 carries the electrolyte for the cell. Under certain conditions wherein space is a consideration, this absorbent mass 6 may be omitted and the electrolyte be carried by the barrier layer 11. An upset portion may be provided at 14 to function as the second electrode of the cell. The upper portion of the inner container 5 is flared outwardly at 12 to a diameter slightly less than the inside diameter of container 2 thereby permitting reception within the container 2 prior to crimping thereof as indicated at 13. Prior to this crimping of the upper portion of container 2 at 13, a preshaped gasket element 10 of rubber material which conforms generally to the contour of the outer flange of cover 3, is disposed between the cover and the container 2. The container top or lid 2 is thereafter set or crimped to permanently seal the battery cell. This rubber seal element 10 additionally provides electrical insulation between the portion of the container 2 providing the cathode terminal or electrode 9 and the top portion 3 which is in electrical contact with the anode pellet 4.

The construction of the cell of Fig. 2 is generally similar to that of Fig. 1 except that the inner container 5 of Fig. 1 has been eliminated. In the construction of the cell of Fig. 2, the cathode pellet 8 and anode pellet 4 are pressed into the container 2 and cap 3 respectively. The barrier layer 11 and the alpha cellulose absorbers 6 containing the electrolyte are disposed between the anode 4 and cathode 8. It is to be noted that any other microporous barrier that is not oxidized may be used. Also a gel or some other type of absorber may be used in place of alpha cellulose.

A shaped gasket 10 of neoprene, or any good insulating plastic, is disposed between the portion 15 of cap 3 and the shaped seat portion 16 of container 2 to provide a protective seal and electrical insulation between these two parts. The cell is thereafter sealed by crimping as shown above 16 in Fig. 2.

The electrolyte incorporated in the cell may be potassium, sodium, lithium or other alkaline or alkaline earth hydroxide in varying proportions.

Mercury in proportions up to 20% by weight may be amalgamated with the cadmium anode to produce a firmer pellet and make the cadmium more available in the chemical reaction. Also a series of perforated plates of cadmium may also be used as the anode to provide more surface area, likewise a corrugated or straight cadmium ribbon or sheet may be used instead of a pressed powder. In some cases this alternate construction may be quite superior to the pressed powder since a greater active surface area is available for diffusion. In this instance an absorber material such as alpha cellulose may be used in contact with the ribbon.

In the event mercurous oxide is used as the cathode material in lieu of mercuric oxide, the cell will display a voltage characteristic of approximately .03 volt higher than cells with mercuric oxide anodes.

The cell operates to produce electrical energy by the chemical action of cadmium and the oxide of mercury in the presence of an alkaline electrolyte when the circuit is closed. The capacity and operation of the cell may be improved by discharging and recharging several times. The barrier layer prevents migration of the solid particles, thus helping to provide a long storage life.

It is thus apparent that a new rechargeable dry cell providing a long shelf life, which is non-gassing on charge or discharge and uses up no electrolyte or water during charge or discharge, has been disclosed.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A rechargeable cell comprising an electro-conductive container, a cathode pellet of compacted mercury oxide disposed within said container in conductive relation thereto, an absorbent barrier layer containing an alkaline hydroxide electrolyte and disposed in contact with one surface of said cathode pellet, an anode pellet of compressed powdered cadmium superposed in contact with said barrier layer, a closure element for said container in electrical contact with said anode pellet, and means providing a seal between said closure element and said container of a character to provide electrical insulation therebetween.

2. A dry-cell of the character of claim 1 in which the anode pellet material is a cadmium amalgam.

3. A dry-cell of the character of claim 1 wherein the anode pellet is of a pasted cadmium material.

4. A rechargeable dry-cell of a character providing a voltage of substantially .9 volt, comprising an anode pellet of compacted powdered cadmium, a cathode of an oxide of mercury, a container providing a first electrode of said cell, said cathode being disposed in said container and in electrical contact therewith, an absorbent barrier element disposed in contact with one face of said cathode pellet and adapted to contain an electrolyte, an alkaline electrolyte carried by said barrier element, said barrier further being disposed in sandwich relation between said anode and cathode, a container closure means having an electro-conductive portion in electrical contact with said anode, and an electrical insulating gasket means disposed in sealing relation between the container and the closure means.

5. A dry-cell of the character of claim 4 additionally characterized by the inclusion of a small amount of graphite mixed with the oxide of mercury cathode to increase the conductivity thereof.

6. A dry-cell of the character of claim 4 further including an absorber of microporous cellulose for containing the electrolyte and disposed in sandwich relation between said barrier and the anode pellet.

7. A rechargeable cell of a non-gassing character comprising a metallic container, a cathode pellet of consolidated oxide of mercury in electro-conductive relation to said container to provide a first electrode of the cell, means for closing said container, an anode pellet of compressed powdered cadmium disposed in said container closing means and in contact therewith in a manner to provide a second electrode of said cell, a barrier layer of unreactive microporous absorbent material disposed in contacting relationship with said cathode, a microporous absorbent mass disposed between said barrier layer and said anode pellet and in mutual contact therewith, an alkaline electrolyte contained by said mass and barrier layer, and an electrical insulating seal disposed between said container and said closure means in a manner providing electrical insulation between said anode pellet and cathode pellet thereby providing a sealed construction for said cell.

8. A cell of the character of claim 7 in which the anode pellet material is a cadmium amalgam.

9. A cell of the character of claim 7 in which the anode pellet is a pasted cadmium material.

References Cited in the file of this patent

UNITED STATES PATENTS

| Number | Name | Date |
|---|---|---|
| 2,636,062 | Colton | Apr. 21, 1953 |

FOREIGN PATENTS

| Number | Country | Date |
|---|---|---|
| 894,554 | France | Mar. 13, 1944 |